Sept. 21, 1926.
A. L. COX
1,600,319
ODOMETER RESETTING DEVICE
Filed Oct. 27, 1925
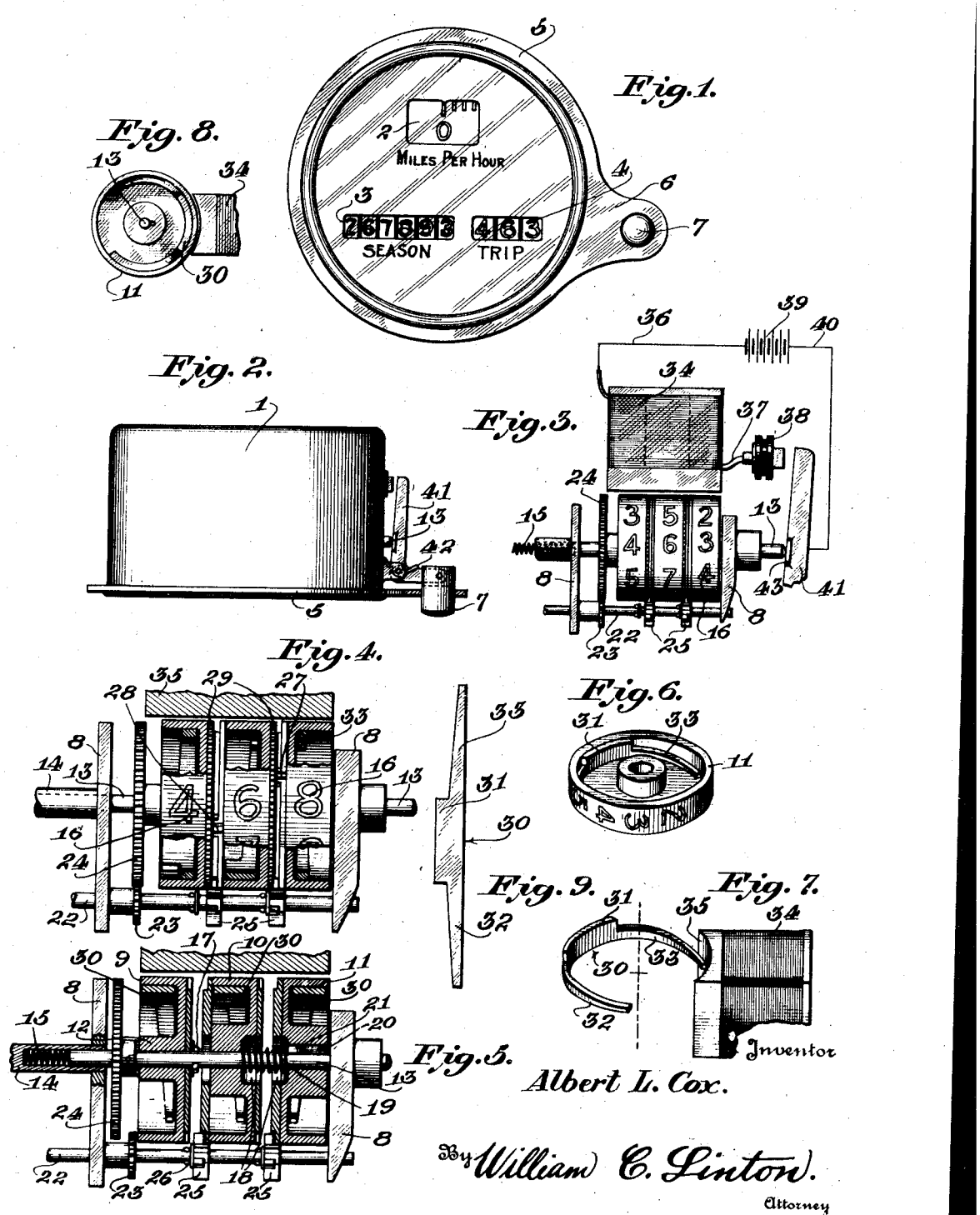
Inventor
Albert L. Cox.
By William C. Linton.
Attorney Patented Sept. 21, 1926.

1,600,319

UNITED STATES PATENT OFFICE.

ALBERT LYMAN COX, OF RALEIGH, NORTH CAROLINA.

ODOMETER-RESETTING DEVICE.

Application filed October 27, 1925. Serial No. 65,221.

This invention relates to improvements in odometers and especially, to those forms of odometers now generally in use in connection with the speedometers of motor driven vehicles whereupon the mileage of the equipped vehicle is registered, to a predetermined point, by the so-termed "trip meter", the invention having for an object to provide a simple and efficient means whereby the numeral carrying wheels of said "trip meter" can be automatically returned to their respective initial starting or zero mileage indicating positions, by the operation of a single control or resetting device.

It is also an equally important object of the invention to provide the odometer or "trip meter" with means collectively operable for disconnecting the numeral carrying wheels from the common driving means, therefor, and influencing the same in a manner as to effect their immediate return rotation to an initial or zero indicating point, at which time the connection of the trip meter with the common driving means will be automatically re-established and the device, thus, rendered ready for another trip mileage registering operation.

Another object of the invention is to provide the numeral carrying wheels of the trip meter with a magnetic means which with disconnection of the said wheels from the driving means therefor, may be energized and caused to function with respect to the wheels to return the same to their initial positions following which, such magnetic means are de-energized and the wheels then left free to be rotated by re-established connection with the driving means therefor.

Yet another object of the invention may be stated to provide the numeral carrying wheels with novel forms of armatures adapted to be influenced by the magnetic resetting means for bringing about resetting of the same to zero indicating positions, these armatures being so constructed as to positively prevent the wheels from assuming positions whereat they will have the force of the magnetic flux of the magnetic resetting means equally applied to the opposite portions thereof, and thus result in their retention in said positions, which may be aptly described as "dead center" positions, but to the contrary, such wheels, at all times and positions, will have a magnetic force of greater intensity applied to one side of their respective armatures, and accordingly, will readily respond to those rotative forces directed thereto in order that they may be returned to zero indicating positions.

Other objects of the invention will be in part obvious and in part pointed out hereinafter.

In order that the invention and its mode of usage may be fully understood by workers skilled in the art, I have, in the accompanying illustrative drawings and in the detailed following description based thereon, set out one possible embodiment of the same.

In these drawings:

Figure 1 is a front elevation of a speedometer equipped with the invention,

Figure 2 is a top view of the same,

Figure 3 is a detail in front elevation of the odometer mechanism or the "trip meter" equipped with the invention, Figure 4 is an enlarged fragmentary detail partly in longitudinal section of the odometer or "trip mechanism" showing the arrangement of the armatures within the numeral carrying wheels and the connection of these wheels to the selective driving means therefor, such driving means being connected to the numeral carrying wheels, Figure 5 is a similar view, the wheels having been shifted to positions disengaging the driving means therefor in order that they may be rotated to their initial or zero indicating positions, Figure 6 is a detail in perspective of one of the numeral carrying wheels, provided with its particular armature, Figure 7 is a fragmentary detail in perspective showing the relation of an armature of one of the numeral carrying wheels to the electromagnet, Figure 8 is an end elevation of a numeral carrying wheel with the armature arranged therein illustrating said numeral carrying wheel in zero indicating or initial position where the widened or thickened portion of the armature is positioned directly adjacent to the magnet, and

Figure 9 is a plan view of one of the armature blanks, that is, before bending of the same into semi-circular shape for engagement in a numeral carrying wheel.

Having more particular reference to the drawings in connection with which like characters of reference will designate corresponding parts throughout, the invention is herein shown, for purposes of illustration as being adapted to a speedometer of generally accepted type or design, such device including in its construction the usual housing 1 adapted to receive or house the operating mechanism thereof while the face side of the speedometer is provided with the usual windows 2, 3 and 4, through which the speed of the vehicle will be indicated, the total mileage traversed by the vehicle will be registered and the mileage, to a predetermined point, of the vehicle, as when on a trip, registered, this latter being effected at the window 4 through the medium of a suitable and approved type of odometer mechanism. A cover carrying a crystal is engaged over the face side of the speedometer, the same being herein indicated for the purpose of convenience by the numeral 5 and having a lateral extension 6 formed on one side thereof provided with an opening through which a push button 7 is slidably received, the purpose of which will be subsequently described. In this connection, it is to be understood that the speedometer mechanism together with the odometer mechanism therein contained may be supported or arranged at any desired position upon a motor driven vehicle, it being the now prevalent custom to arrange such devices upon the so-termed "instrument board" of an equipped vehicle.

The odometer mechanism provided for the total mileage indicating means and the trip mileage registering means is, as usual, supported upon a suitable frame within the housing 1, a portion of which is herein shown and indicated by the numeral 8. In this connection, since the invention is concerned only with that odometer mechanism associated with the window 4, to wit, on the "trip meter" of the device, I will refer hereinafter only to that mechanism. Likewise, it is to be understood that while such odometer or "trip meter" mechanism is herein described as being associated with a speedometer and with other odometer mechanism for recording the total mileage traversed by an equipped vehicle, such "trip meter" may be completely disassociated therefrom and likewise, may be, in some instances, advantageously employed or associated with various other forms of mechanism.

The trip mileage registering meter, hereinafter termed the "trip meter" may be stated to comprise a plurality of juxtaposed numeral carrying wheels 9, 10 and 11, each of which are provided with appropriate hub portions 12 loosely mounted for rotary movement upon the shaft 13 mounted for sliding movement in suitable bearings provided therefor in adjacent portions of the supporting frame 8 aforesaid; a portion of the shaft 13 being extended through an opening formed in an adjacent portion of the housing 1 to a point exteriorly thereof as indicated in the Figure 2, while the inner end of the shaft is slidably received in a pocketed bracket 14 having an expansion coil spring 15 interposed between the bottom of the pocket and the adjacent end of said shaft 13 whereby the shaft will be normally and yieldably retained in its outermost or extended position, that is, that position as is shown in Figure 2, wherein the outer end of such shaft is extended for a distance beyond the adjacent side wall of the housing 1.

Each of the numeral carrying wheels have numerals ranging from 0 to 9 disposed in equally spaced relation about the peripherial surfaces thereof as designated by the numeral 15 and the numerals, as will be understood with reference to the Figure 1, are adapted to be displayed in sequential order before the window 4, in order that an operator of any such vehicle may accurately ascertain the mileage traversed by his vehicle up to a point until a mileage registering limit of the trip meter has been reached, whereupon the various numeral carrying wheels will reassume their zero indicating positions and with continued operation, effect a further registering of the trip mileage. The numeral carrying wheels, also, in addition to being loosely mounted for rotation upon the shaft 13, are capable of limited sliding movement thereon and to this end, an abutment pin 17 is passed through a portion of the shaft 13 in proximity to one side of the numeral carrying wheel 9 while the adjacent faces of the hub portions of the numeral carrying wheels 10 and 11 are formed with recesses 18 receiving the opposed end of a coil spring 19 therein, such spring being engaged or coiled about the adjacent portion of the shaft 13 and exerting outward pressures upon those portions of the numeral carrying wheels 10 and 11 engaged by the outermost convolutions thereof. Likewise, the hub portion of the numeral carrying wheel 11 is formed with a transversely disposed keyway 20 adapted to have a key 21 carried upon an adjacent portion of the shaft 13 slidably received therein, thus effecting a splined connection as between said shaft 13 and the hub portion of the numeral carrying wheel 11.

In order that rotary movement may be transmitted to the various numeral carrying wheels 9, 10 and 11 rotatably mounted upon the shaft 13, a driving shaft 22 is extended into proximity to and mounted upon that portion of the frame 8 receiving the trip meter mechanism in the manner indicated in the Figure 3, and has a pinion 23 fixedly mounted thereon adapted to normally mesh with a gear 24 fixedly mounted upon the adjacent end portion of the shaft 13. Thus, it will be understood that with rotation of the driving shaft 22, from suitable power transmitting mechanism connection to the vehicle wheels, transmission etc., rotary motion will be directed from the pinion 23 to the gears 24 and then by way of the splined connection with the hub of the numeral carrying wheel 11 to said wheel.

Upon that portion of the driving shaft 22 mounted in the oppositely disposed portions of the frame 8 carrying the trip meter, intermediate gears 25 are loosely mounted, these gears having certain of the teeth thereof, that is, the alternately arranged teeth thereof of less width than the other, as is shown in the Figures 4 and 5. Sliding movement of the gears 25 on the shaft 22 is permitted to certain limits, these limits being governed by the forming of ears, or bosses 26 upon portions of the shaft and thus constituting effectual stops whereby to limit such sliding movement of the gears. In this connection, it is to be noted that the gears 25 adjacent the numeral carrying wheels 10 and 11, while being loosely mounted upon the driving shaft 22 is normally maintained in abutting engagement with its particular stops 26 while the remaining gear 25 when in its normal position is spaced with respect to its particular stops after the manner as indicated in Figure 4.

A conventional form of motion transfer mechanism is employed in connection with the numeral carrying wheels 9, 10 and 11, as shown.

Thus far, it will be seen that I have provided a mechanism for registering mileage traversed by a vehicle upon the so-called trip meter. In order that the numeral carrying wheels of this trip meter may, when desired, be immediately and automatically returned to their initial starting or zero indicating positions, whereas the trip meter may be reset for a new registering operation, I arrange within each of the shell like numeral carrying wheels, 9, 10 and 11, semicircular armatures generally indicated in the drawings by the numeral 30. These armatures 30 are preferably formed of soft iron or mild steel and have thickened portions 31 therein intermediate their ends as is clearly indicated in the Figure 9, the opposite ends or leg portions of the armatures being of unequal lengths as respectively indicated at this time by the numerals 32 and 33, the numeral 32 indicating the shorter leg portion while the numeral 33 indicates the other. The armatures may, if desired, be held with frictional engagement within the shell like portions of the various numeral carrying wheels 9, 10 and 11, or if desired, they may be secured to the adjacent portions of the inner peripheral surfaces of such wheels by suitable means, common in the art. In this connection, it is pertinent to note that the widened portions 31 of the armatures are of widths so as to lie slightly within the outer margin portions of their respective numeral carrying wheels in the manner as indicated in the Figure 5.

An electromagnet 34 is fixedly supported in proximity to one side of the trip meter constituted by the numeral carrying wheels 9, 10 and 11 and has the cores thereof provided with windings and formed with an arcuately curved surface 35, corresponding to the surfaces of the segmental armatures 30, as is indicated in the Figure 7. The opposite sides of this electromagnet are connected to conductors 36 and 37, the latter being electrically connected to a suitable contact 38 while the former is extended into engagement with one side of a suitable force of electrical energy 39. Conductor 40 is extended from the opposite side of this source of electrical energy into engagement with a bell crank lever 41, the angle portion of which is suitably mounted in bearing brackets 42 while a coil spring has one end of the same engaged therewith in order that that end of the same adjacent the contact portion 38 will be normally maintained disengaged therefrom in the manner indicated in the Figures 2 and 3. The remaining extremity of this lever 41 is pivotally connected to the push button 7, hereinbefore described, while an intermediate portion of the longer side of said lever is formed with a widened portion 43 adapted to have bearing upon the adjacent and extended end of the shaft 13 whereby to impart, at times, an inward thrust thereto against the tension of the coil springs 15 and 19.

The operation of the improved trip meter returning means may be stated as follows:

Assuming that the various numeral carrying wheels 9, 10 and 11 are in their initial starting or zero indicating position with respect to the window 4, upon transmission of rotary motion to the driving shaft 22, such motion will be conveyed to the pinion 23 and gear 24 to the slidably mounted shaft 13 and then through the splined connection to the numeral carrying wheels 11, whereupon said wheels will be continuously rotated, transmitting, thereby, a step by step rotary motion to the adjacent gears 25 when the gear tooth receiving pocket upon the inner face of said wheel 11 engaged with the adjacent teeth of said gear 25. Step by step rotary motion from the gear 25 will in turn, be transmitted through the adjacent numeral carrying wheel 10 by reason of the fact that the tooth carrying pockets 29 thereupon are normally enmeshed with the opposite sides of the teeth of this particular gear. Thus, it will be understood that the numeral carrying wheels 11 and 10 will be rotated so as to successively display the numerals 16 thereupon before the window 4. With the transmission of step by step motion to the numeral carrying wheels 10, the single gear tooth engaging pocket upon the opposite face of this particular wheel will engage with an adjacent tooth upon the second or remaining gear 25 and thus impart a step by step rotary movement to it, which in turn, will be transmitted to the numeral carrying wheel 9 through the gear teeth receiving pocket 29 formed upon the adjacent face thereof in order that the numerals 16 upon this particular face will be successively passed before the window 4 in order that the mileage traversed by the equipped vehicle will be accurately registered upon the trip meter. Should it now become necessary or desirable to reset the numeral carrying wheels of the trip meter, that is, return the same to their initial starting or zero indicating positions, the button 7 is pushed inwardly, thereby rocking the bell crank lever 41 and causing the angularly opposite side of the same to be brought into engagement with the extended end of the pliable shaft 13 and the contact point 38. As the widened portion 43 of the lever engaging the extended end of the driven shaft 13, said shaft will be forced inwardly against the tension of the spring 15, the key 21 sliding through the keyway 20 in the hub portion of the numeral carrying wheel 11 while the spring 19 interposed between the wheels 10 and 11 will be of a tension sufficient to impart an inward thrust to the wheel 10 sliding into position as shown in Figure 5. Simultaneously, the numeral carrying wheel 9 will be slid to that position as is also shown in the Figure 5 in that the abutment pin 17 will engage with the adjacent frame thereof. Likewise, the gear 24 will be simultaneously moved with the shaft 13 and disengaged from the pinion 23 upon the driving shaft 22, thereby disconnecting the driven shaft 13 from the driving shaft 22 and rendering it possible for said driven shaft to rotate freely without any interference whatsoever from the driving shaft. With the numeral carrying wheels 9 and 10 in positions as shown in Figure 5, it will be understood that the circularly disposed series of gear teeth receiving pockets 29 on certain of the adjacent faces will be disengaged from the adjacent portions of their particular gears 25 and thus, these wheels 9, 10 and 11 will be permitted to rotate freely with respect to each other.

Concurrently with the moving of the shaft 13 to its disengaged position with respect to the driving shaft 22 and the simultaneous moving of the numeral carrying wheels 9, 10 and 11 to disengaged positions with respect to each other, the electromagnet 34 will be energized in that the bell crank lever will have the free end thereof engaged with the electrical contact 38, thus completing electrical circuit through the coils of the electromagnet. The electromagnet being thus magnetized or energized, will serve to attract the widened portions 31 of the various armatures 30 to position directly adjacent or in coaxial alignment with the core thereof, as for example, the position indicated in the Figure 8. In this connection, it will be understood that because of the widening of the intermediate portions of the armatures as indicated at 31, such widened portion will be attracted to a greater extent, through the influences of the resultant magnetic flux. In arranging the armatures 30 within their respective numeral carrying wheels 9, 10 and 11, the widest portions 31 thereof are so positioned with respect to the numerals upon their peripheral surfaces that the zero numerals will appear before the window 4 with attraction of said widest portions 31 to that position as indicated in Figure 8. Thus, it will be understood that with magnetizing of the electromagnet 34, the same will serve to automatically influence and return the numeral carrying wheels 9, 10 and 11 to their initial starting or zero indicating positions, with respect to the said window 4. At this point, it is also of interest to note that because of the forming of legs 32 and 33 of unequal length upon opposite sides of the widest portions 31 of the armature 30, said widest portions will at all times be positively prevented from assuming positions whereat they will have the force of the magnetic flux from the magnetic resetting means (the electromagnet 24) equally applied to the opposite portions thereof. This, should it occur, would result in the retention of the widened portions 31 of the armatures 30 and by consequence, the various numeral carrying wheels 9, 10 and 11, in what may be aptly described as "dead center" positions, inasmuch as the equally applied portion of the magnetic field upon the opposite sides of the armatures would be counter balanced and rotation could not therefore be effected. To the contrary, by forming the leg portions 32 and 33 of unequal length, it will be understood that the armatures, and by consequence, their respective numeral carrying wheels will have a magnetic force of greater intensity applied to certain of their sides and accordingly, will readily respond to those rotative forces directed thereto in order that they may be respectively returned to the zero indicating or initial positions, as is shown in the Figure 8.

In this return or resetting of the numeral carrying wheels of the trip meter to initial starting or zero indicating positions, the push button 7 is disengaged by the vehicle operator whereupon the electrical circuit to the electromagnet 34 is interrupted and the magnet is thus de-energized while the extended end of the slidable driven shaft 13 is disengaged, hence permitting this shaft to return under influence of the expansible coil spring 15 to its normal position, whereat the gear 24 will re-engage the pinion 23; the numeral carrying wheels 9, 10 and 11 moved to those positions as indicated in the Figure 4, and, the gear wheels 25 reengaged or arranged in position to be engaged with the tooth receiving pockets formed upon the adjacent faces of their respective numeral carrying wheels. At this time, connection of the trip meter will be re-established for an essential mileage trip registering operation.

Manifestly, the construction shown is capable of considerable modification and such modification as is within the scope of the appended claims, I consider within the spirit of my invention.

I claim:

1. A resetting device for odometers, comprising in combination with a plurality of numeral carrying and registering wheels, semi-circular armatures carried within each of said wheels adjacent their inner peripherial portions and decreasing in cross sectional area toward each end, and electromagnetic means cooperatively associated with said armatures, imparting rotary motion to the same and to their respective wheels, for returning said wheels to zero indicating positions.

2. A resetting device for odometers, comprising in combination with a plurality of numeral carrying and registering wheels, armatures arranged within each of said wheels adjacent their inner peripheral surfaces, arms extending circumferentially different distances from the opposite ends of the armature portions of said armatures being widened, electromagnetic means cooperatively associated with said armatures and adapted, at times, to impart rotary motion thereto, and to their respective wheels for returning such wheels to zero indicating positions.

3. A resetting device for numeral carrying and registering members, an armature received and carried by each member, portions of said armatures being widened, electromagnetic means cooperatively associated with said armatures adapted, at times, to impart motion to the same and their registering members for returning the latter to their respective zero indicating positions, and the ends of each armature being of unequal length and of less width than the widened portions thereof substantially as and for the purpose specified.

4. An odometer mechanism having a plurality of numeral carrying wheels and disengageable means for driving the wheels, of armatures arranged on the inner circumferential faces of the wheels, said armatures having a relatively wide medial portion, tapered arms extending from the opposite ends of the said medial portion, and of different lengths, an electromagnet normally positioned adjacent the peripheries of said wheels, and a common control lever for actuating the disengageable wheel drive means and effecting energization of the magnet.

5. A resetting device for odometers comprising in combination numeral carrying wheels, magnetic means for returning said wheels to their zero positions, a switch included in said magnetic means, a lever adapted at times to actuate said switch and disengageable means, and a push button connected to said lever whereby the latter may be collectively operated.

6. A resetting device for odometers comprising in combination numeral carrying and registering wheels, disengageable means for driving the wheels including a projecting shaft, magnetic means for returning said wheels to their zero position when the wheels are disengaged from the driving means, a switch included in said magnetic means, a bell crank lever adapted at times to engage said switch and the projecting shaft of said disengageable means, and a push button pivotally connected to said lever whereby said wheel disengageable means and said magnetic means may be jointly controlled.

7. A resetting device for odometers comprising in combination numeral carrying and registering wheels, means for imparting rotary motion to said wheels whereby they at times may be returned to their zero positions, and means whereby said wheels will be caused to move by their respective dead centers when said means for imparting rotary motion to said wheels is brought into operation.

In witness whereof I have hereunto set my hand.

ALBERT LYMAN COX.